United States Patent
Prenzel

(10) Patent No.: US 9,540,458 B2
(45) Date of Patent: *Jan. 10, 2017

(54) METHOD FOR PRODUCING NON-COLORED POLYACRYLATE ADHESIVE COMPOUNDS WITH A NARROW MOLAR MASS DISTRIBUTION

(71) Applicant: TESA SE, Hamburg (DE)

(72) Inventor: Alexander Prenzel, Hamburg (DE)

(73) Assignee: tesa SE, Norderstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/356,477

(22) PCT Filed: Sep. 28, 2012

(86) PCT No.: PCT/EP2012/069288
§ 371 (c)(1),
(2) Date: May 6, 2014

(87) PCT Pub. No.: WO2013/072120
PCT Pub. Date: May 23, 2013

(65) Prior Publication Data
US 2014/0288242 A1    Sep. 25, 2014

(30) Foreign Application Priority Data

Nov. 16, 2011  (DE) .................. 10 2011 086 502

(51) Int. Cl.
| | |
|---|---|
| *C08F 8/42* | (2006.01) |
| *C08F 2/38* | (2006.01) |
| *C08F 220/18* | (2006.01) |
| *C09J 153/00* | (2006.01) |
| *C08F 8/00* | (2006.01) |

(52) U.S. Cl.
CPC . *C08F 8/42* (2013.01); *C08F 2/38* (2013.01); *C08F 8/00* (2013.01); *C08F 220/18* (2013.01); *C09J 153/005* (2013.01); C08F 2438/03 (2013.01); C08F 2800/20 (2013.01); C08F 2810/20 (2013.01); C08F 2810/30 (2013.01); C08F 2810/40 (2013.01)

(58) Field of Classification Search
None
See application file for complete search history.

(56) References Cited

U.S. PATENT DOCUMENTS

| | | | |
|---|---|---|---|
| 2010/0239778 A1 | 9/2010 | Erwin et al. | |
| 2012/0289657 A1 | 11/2012 | Hilf et al. | |
| 2012/0309895 A1 * | 12/2012 | Schmidt | C09J 4/00 524/599 |

FOREIGN PATENT DOCUMENTS

| | | |
|---|---|---|
| DE | 102010001987 A1 | 8/2011 |
| DE | 102010001992 A1 | 8/2011 |
| EP | 1626994 B1 | 2/2006 |
| WO | 98/01478 A1 | 1/1998 |
| WO | 99/31144 A1 | 6/1999 |
| WO | 2011/101176 A1 | 8/2011 |
| WO | 2011101175 A1 | 8/2011 |
| WO | WO 2011/101176 * | 8/2011 |

OTHER PUBLICATIONS

Bousquet, Journal of Polymer Science: Part A, vol. 48, p. 1773-1781 (2010).*
Bousquet et al., "Synthesis of Comb Polymers via Grafting-onto Macromolecules Bearing Pendant Diene Groups via the Hetero-Diels-Alder-RAFT Click Concept", Journal of Polymer Science Part A: Polymer Chemistry, vol. 48, No. 8, pp. 1173-1781, Apr. 15, 2010.
Inglis et al., "Ultrafact Click Conjugation of Macromolecular Building Blocks at Ambient Temperature", Angewandte Chemie International Edition, vol. 48, pp. 2411-2414, 2009.
Moad et al., "End-Functional Polymers, Thiocarbonylthio Group Removal/Transformation and Reversible Addition-Fragmentation-Chain Transfer (RAFT) Polymerization", Polym. International, vol. 60, pp. 9-25, Jun. 2010.
Nebhani et al., "Quantification of Grafting Densities Achieved via Modular "Grafting-to" Approaches onto Divinylbenzene Microspheres", Advanced Functional Materials, vol. 20, pp. 2010-2020, 2010.
Willcock and O'Reilly, "End Group Removal and Modification of RAFT Polymers", Polymer Chemistry, vol. 1, pp. 149-157, 2010.
International Search Report dated Dec. 19, 2012, mailed Jan. 4, 2013.
English Translation of International Search Report dated Dec. 19, 2012, mailed Jan. 4, 2013.
German Search Report dated Sep. 28, 2012.
Andrew J. Inglis et al., "Ultrafast Click Conjugation of Macromolecular Building Blocks at Ambient Temperature", Angew. Chem.Int.Ed., vol. 48, No. 13, pp. 2411-2414, published 2009.
Antoine Bousquet et al., "Synthesis of Comb Polymers via Grafting-Onto Macromolecules Bearing Pendant Diene Groups via the Hetero-Diels-Alder-RAFT Click Concept", Journal of Polymer Science: Part A: Polymer Chemistry, vol. 48, No. 8, pp. 1773-1781, published 2010.
English Translation of an Office Action dated Jul. 10, 2015, issued by the Chinese Patent Office.

* cited by examiner

*Primary Examiner* — Robert C Boyle
(74) *Attorney, Agent, or Firm* — Norris McLaughlin & Marcus PA

(57) ABSTRACT

Method for producing polyacrylate adhesive compounds with a narrow molar mass distribution by radical polymerization and subsequent decolorization of colored reaction products resulting therefrom.

8 Claims, No Drawings

METHOD FOR PRODUCING NON-COLORED POLYACRYLATE ADHESIVE COMPOUNDS WITH A NARROW MOLAR MASS DISTRIBUTION

This is a 371 of PCT/EP2012/069288 filed 28 Sep. 2012, which claims foreign priority benefit under 35 U.S.C. §119 of German Patent Application No. 10 2011 086 502.0 filed Nov. 16, 2011, the entire contents of which are incorporated herein by reference.

The present invention relates to a method for producing uncolored polyacrylate adhesives having narrow molar mass distribution by means of free-radical polymerization, and to products which are produced with these adhesives.

BACKGROUND OF THE INVENTION

Industrial adhesive tape applications very often use pressure sensitive polyacrylate adhesives. Polyacrylates possess diverse advantages over other elastomers. They are highly stable toward UV light, oxygen, and ozone. Synthetic and natural rubber adhesives usually contain double bonds, which render these adhesives unstable toward the aforementioned environmental influences. Another advantage of polyacrylates is their transparency and their capacity for use across a relatively broad temperature range.

Pressure sensitive polyacrylate adhesives are prepared generally in solution by a free radical polymerization. Generally speaking, the polyacrylates in solution are coated via a coating bar onto the carrier material in question, and are subsequently dried. In order to raise the cohesion, the polymer is generally crosslinked. Curing proceeds thermally, by UV crosslinking (ultraviolet radiation), or by EB curing (EB: electron beams). The operation described is relatively costly and inconvenient and is environmentally objectionable, since the solvent is generally not recycled, and a high level of organic solvent consumption entails a high environmental burden.

It is very difficult, moreover, to produce pressure sensitive adhesive tapes with high coatweight without bubbles.

An improvement in these disadvantages is provided by the hotmelt process. In this hotmelt process, the pressure sensitive adhesive (PSA) is applied in the melt to the carrier material.

This new technology, however, also entails restrictions. Before the coating operation, the solvent is removed from the PSA in a drying extruder. The drying procedure involves a relatively high temperature and shearing exposure, causing high damage particularly to high molecular mass polyacrylate PSAs. The acrylate PSA gels, or the low molecular mass fraction is increased greatly as a result of molecular weight reduction. Both effects are undesirable, being deleterious to use. Either the adhesive can no longer be coated, or else there are changes in the technical properties of the PSA, since, for example, on exposure of the adhesive to a shearing force, the low molecular mass fractions act as lubricants and so lead to premature failure of the adhesive.

A solution to avoiding these disadvantages is offered by polyacrylate adhesives with a low average molecular weight and narrow molecular weight distribution. Here, the polymerization procedure greatly reduces the proportion of low molecular mass and high molecular mass molecules in the polymer. The removal of the high molecular mass fractions lowers the flow viscosity, and the adhesive exhibits less of a tendency to gel. The lowering in the low molecular mass fraction reduces the number of oligomers that lower the shear strength of the PSA.

A variety of polymerization techniques are suitable for the production of low molecular mass PSAs. State of the art is the use of chain transfer agents (CTAs), such as of alcohols or thiols, for example. These CTAs reduce the molecular weight, but broaden the molecular weight distribution.

Another control polymerization technique employed is that of Atom Transfer Radical Polymerization, ATRP, where preferably monofunctional or difunctional secondary or tertiary halides are used as initiator, and certain metal complexes are used for the purpose of abstracting the halide or halides. As a side-effect, however, the metal catalysts employed generally influence the aging of the PSAs in a negative way (gelling, transesterification). Moreover, the majority of metal catalysts are toxic, discolor the adhesive, and are removable from the polymer only by costly and inconvenient precipitations.

Other controlled radical polymerization processes utilize a compound of the formula R'R"N—O—X, for example, as initiator, in which X represents a free radical species which is able to polymerize unsaturated monomers; very specific radical compounds, such as phosphorus-containing nitroxides or specific nitroxyls, for example, which are based on imidazolidine, morpholines, piperazinones, or piperazindiones. In general, however, the reactions exhibit low conversion rates, particularly for the polymerization of acrylates, leading to very low yields and molecular weights, and/or relatively high temperatures are needed in order to shift the equilibrium between the "dormant" and the active radical species to the side of the active species, and in order, thus, to increase the net reaction rate. The choice of solvents is therefore confined essentially to high-boiling solvents.

One suitable method for producing narrow-range polymers is that known as the RAFT procedure (Reversible Addition-Fragmentation Chain Transfer), described for example in specifications WO 98/01478 A1 and WO 99/31144 A1. The procedure described therein is not immediately suited to the production of PSAs, since the conversions achieved are very low and the average molecular weight of the polymers prepared is too low for PSAs, especially those based on acrylate. Consequently, the polymers produced in this way cannot be employed as acrylate PSAs.

Onward developments of this procedure, through the introduction of thioesters or trithiocarbonates, are a topic of research. For instance, EP 1 626 994 A1 describes improved RAFT CTAs, with which it has proved possible to produce polyacrylate PSAs for hotmelt coatings. The RAFT procedure has significant advantages over ATRP and over nitroxyl-controlled polymerization, since there is no need to accept a reduction in reaction rate, nor to use expensive and in some cases unstable catalysts, and the RAFT CTAs are more universal in their usefulness.

Generally speaking, nevertheless, acrylate PSAs obtained by means of sulfur-containing RAFT reagents of these kinds have disadvantages for numerous spheres of use. Polymers prepared with RAFT CTAs, especially (pressure sensitive) adhesives, do in fact have very defined polymer constructions and polydispersities, and can therefore be adjusted very effectively in terms of their technical adhesive properties. By the nature of the RAFT CTAs, however, because of the chromophoric sites of the functional groups (having conjugated double bonds containing especially sulfur atoms, optionally oxygen or nitrogen atoms), the polymers obtained are generally relatively intense yellow to brown in color, which is intolerable for a multitude of applications in the adhesive tapes sector. Moreover, production-related sulfur fragments in the polymers, by-products and CTA residues can have a very unpleasant odor and are typically themselves colored.

It is therefore an object of the invention to provide a corresponding polymerization method, by which polyacrylate adhesives having a narrow molar mass distribution can be prepared, but which has the disadvantages of the prior art cited only to a reduced degree, if at all. Significant disadvantages include the slow reaction rate of the ATRP and the nitroxyl-controlled polymerization, and also the odor and the color of the RAFT CTAs.

It has been found that, surprisingly, the combination of a RAFT process with subsequent addition of a diene compound after completion of the polymerization afforded polyacrylate pressure-sensitive adhesive systems that are virtually colorless and odorless, but were nevertheless prepared utilizing the advantages of the RAFT process, namely the high reaction rate and the narrow molar mass distribution.

SUMMARY OF THE INVENTION

The invention therefore relates to a method for preparing acrylate-based polymers, wherein first a controlled radical polymerization reaction of an initial reaction charge comprising at least one acrylate-based monomer, in other words of an acrylate-based monomer or of a monomer mixture comprising at least one acrylate-based monomer, in each case customarily in the presence of solvents, is carried out in the presence of at least one chain transfer agent (CTA) having a functional group S—C=X, where X=S, O or N, with the CTA being selected from the group encompassing dithioesters, i.e., compounds of the general structure

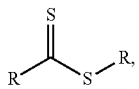

dithiocarbonates, and specifically both the S,S'-substituted dithiocarbonates, i.e., compounds of the general structure

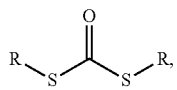

and xanthates (O,S-substituted dithiocarbonates), i.e., compounds of the general structure

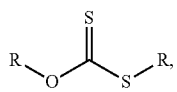

dithiocarbamates, i.e., compounds of the general structure

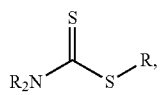

trithiocarbonates, i.e., compounds of the general structure

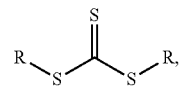

and
imidodithiocarbonates, i.e., compounds of the general structure

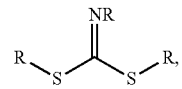

where, above, R generally and independently at each occurrence selectedly represents organic radicals or else, optionally, inorganic radicals (the members of the stated group of CTAs are also referred to in the context of this specification as "RAFT CTAs" or as polymerization regulators).

The majority of the CTA molecules, and more particularly virtually all CTA molecules, are incorporated into the polymer chains that form in such a way that the respective polymer chain has at least one functional group of a CTA incorporated into it. In accordance with the invention—preferably after completion of the polymerization reaction—at least one chemical compound which has at least two conjugated double bonds (this chemical compound is referred to hereinafter as "conjugated diene") is brought into contact with the polymers thus obtained, such that hetero-Diels-Alder reactions are brought about between the double bonds C=X (with X=S, O or N) of the functional groups S—C=X incorporated into the polymer chains and the conjugated double bonds of the conjugated diene, as a result of which the chromophoric sites in particular react and decolorization takes place.

DETAILED DESCRIPTION

Where reference is made in the context of this specification to a "chemical compound" or a "chemical substance"—such as, for example, even a monomer, a CTA, an initiator, or the like—the reference is not to the individual molecule, but instead to the nature of this chemical compound or substance, i.e., the respective group of identical molecules. Where the individual molecule is meant, the reference will be to the molecule of the corresponding chemical substance (in other words, for example, to a monomer molecule, a CTA molecule, or an initiator molecule, respectively). The expression "two or more chemical compounds" (for example, among other things, two or more monomers, two or more CTAs, and so on) accordingly denotes two or more groups of identical molecules (for example, "two or more monomers" means two or more groups of identical monomer molecules in the respective group, with the monomer molecules differing between the respective groups; "two or more CTAs" means two or more groups of identical CTA molecules in the respective group, with the CTA molecules differing between the respective groups; and so on). Where, in contrast, a functional group is referred to, the reference is to the individual functional group, unless otherwise indicated in the specific case.

The method of the invention permits the preparation of well-defined acrylate polymers, which can be outstandingly employed as adhesives, more particularly as PSAs, or can be processed further to such adhesives/PSAs.

The term, "pressure sensitive adhesive" (PSA) refers, as is customary, to those viscoelastic, polymeric compositions which—optionally as a result of appropriate additization with further components, such as tackifier resins, for example—are durably tacky and permanently adhesive at the application temperature (room temperature unless otherwise defined) and adhere to a multiplicity of surfaces on contact, with adhesion more particularly being instantaneous (which exhibit what is called "tack" [also referred to as stickiness or touch-stickiness]). They are capable, even at the application temperature and without activation by solvent or by heat, but optionally under the influence of a more or less high pressure, of wetting a bonding substrate sufficiently to allow interactions sufficient for adhesion to develop between the composition and the substrate.

The polymerization is initiated advantageously by one or more radical initiators. Suitable radical initiators for the polymerization include, in particular, thermally decomposing initiators, especially radical-forming azo or peroxo initiators. The initiator or initiators are preferably added before and/or in the course of the polymerization. Multiple initiation is preferred, for which a first addition of initiator is made before or at the beginning of the polymerization, and for which at least one further addition of initiator takes place in the course of the polymerization; advantageously, the addition of further initiators is made in at least two method stages. In this case, in each step of addition, it is possible to use the initiator employed first, an initiator already employed before, or a different initiator. Suitable in principle are all customary initiators known for acrylates.

Examples of radical sources are peroxides, hydroperoxides, and azo compounds; a number of nonexclusive examples of typical radical initiators include potassium peroxodisulfate, dibenzoyl peroxide, cumene hydroperoxide, cyclohexanone peroxide, di-tert-butyl peroxide, azo-bis(isobutyronitrile), cyclohexylsulfonyl acetyl peroxide, diisopropyl percarbonate, bis(4-tert-butylcyclohexyl) peroxydicarbonate (Perkadox® 16 from Akzo Nobel), tert-butyl peroctoate, and benzopinacol. In one very preferred version, radical initiators used are 2,2'-azo-bis-(2-methylbutyronitrile) (Vazo 67® from DuPont) and/or 1,1'-azo-bis-(cyclohexanecarbonitrile) (Vazo 88® from DuPont).

It is also possible, furthermore, to use radical sources which release radicals only on irradiation with UV light.

For the thermally decomposing initiators, the introduction of heat is essential to the initiation of the polymerization. The polymerization for the thermally decomposing initiators can be initiated more particularly by heating to 50 to 160° C., depending on initiator type. For the use of UV initiators, UV light of the appropriate wavelength is beamed in. This reaction may be carried out more particularly in a temperature range from 0° C. to 150° C.

In one advantageous development of the method, the polymerization—especially via presence of at least one radical initiator—is carried out with at least one dithioester and/or trithiocarbonate as polymerization regulator. In one preferred variant of the inventive method, RAFT CTAs used are compounds of the following general structural formula

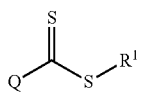

(I)

where Q and $R^1$ are selected independently of one another, and Q is preferably a radical from one of groups a) to n), and $R^1$ is preferably a radical from one of groups a), c) to f), or h):

a) branched and unbranched $C_1$ to $C_{18}$ alkyl, branched and unbranched $C_3$ to $C_{18}$ alkenyl, and branched and unbranched $C_3$ to $C_{18}$ alkynyl radicals
b) ethenyl and ethynyl radicals
c) unfused and fused aryl radicals, especially $C_6$ to $C_{18}$ aryl radicals, more particularly unsubstituted or substituted phenyl radicals, and unsubstituted or substituted benzyl radicals
d) aliphatic heterocyclic radicals, more particularly $C_3$ to $C_{12}$ cycloalkyl radicals
e) aromatic heterocyclic radicals
f) substituted radicals of group a), more particularly
   f1) radicals of group a) each substituted by at least one OH group, halogen atom or silyl ether,
   f2) radicals of group a) each substituted by at least one ester, amine, carbonate, cyano, isocyano and/or epoxide group and/or by sulfur,
g) substituted radicals of group a), more particularly
   g1) radicals of group b) each substituted by at least one OH group, halogen atom or silyl ether,
   g2) radicals of group b) each substituted by at least one ester, amine, carbonate, cyano, isocyano and/or epoxide group and/or by sulfur,
h) $-NH_2$, $-NHR^I$, $-NR^IR^{II}$, $-NH-C(O)-R^I$, $-NR^I-C(O)-R^{II}$, $-NH-C(S)-R^I$, $-NR^I-C(S)-R^{II}$,

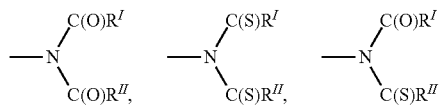

where $R^I$ and $R^{II}$ are radicals selected independently of one another from groups a) to g)
i) $-S-R^I$, $-S-C(S)-R^I$, where $R^I$ is a radical selected from one of groups a) to g),
k) $-O-R^I$, $-O-C(O)-R^I$, where $R^I$ is a radical selected from one of groups a) to g),
l) radicals containing phosphate groups, more particularly $-P(O)(OR^{III})(OR^{IV})$, where $R^{III}$ and $R^{IV}$ are identical or radicals selected independently of one another from groups a) to g),
m) $C_2$ to $C_{18}$ heteroalkyl radicals having at least one O atom and/or at least one $NR^I$ group in the carbon chain, where $R^I$ is a radical selected from one of groups a) to g),
n) hydrogen.

The stated substituent listings serve only as examples of the respective groups of compounds, and make no claim to completeness.

Also suitable as polymerization regulators are compounds of the following types

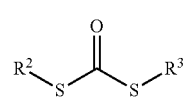

(II)

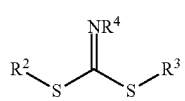

(III)

where $R^2$, $R^3$, and $R^4$ are selected independently of one another from groups a) to m).

In a particularly preferred procedure in accordance with the invention, the following compounds

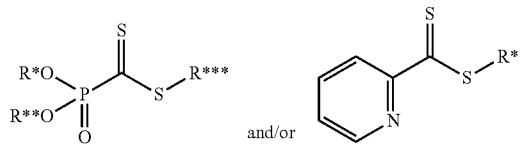

are used as polymerization regulators, where R*, R and R*, in general terms and each selected independently, are organic radicals or else optionally inorganic radicals; more particularly, these regulators are used in the form of the compounds (IV)

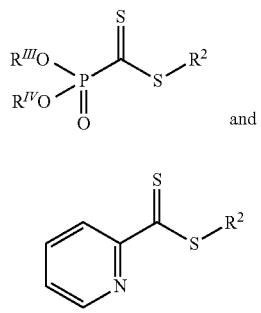

and (V)

where $R^2$, $R^{III}$ and $R^{IV}$ are defined as above.

With great advantage, the quantity of the RAFT CTAs is selected such that they are employed in total with an (overall) weight fraction of 0.001%-5%, more particularly of 0.025% to 0.25%, based on the monomers. In the inventive sense, moreover, it is very useful if the molar ratio of radical initiator added first (first step of addition) to the amount of all RAFT CTAs is in the range from 50:1 to 1:1, more particularly between 10:1 and 2:1.

The method is particularly outstandingly suitable for the preparation of acrylate-based polymers, these being those polymers which in part, more particularly predominantly (i.e., to an extent of more than 50 wt %), are attributable to acrylic acid, methacrylic acid, acrylic esters and/or methacrylic esters as monomers (referred to hereinafter collectively as "acrylic monomers") (where reference is made generally, for the purposes of this specification, to "acrylic" or "acrylate", the intention is to include therein the corresponding methyl-substituted derivatives, in other words the methacrylic compounds, unless specifically maintained otherwise). Equally, the expression "(meth)acrylic" embraces the corresponding acrylic compounds and the corresponding methacrylic compounds.

The method is particularly suitable for the preparation of acrylate PSAs. PSAs consist customarily of a polymer component, also referred to as base polymer component, which may be a homopolymer, a copolymer, or a blend of polymers (homopolymers and/or copolymers). The composition of the polymer component may be selected according to the desired properties of the PSA. The base polymer component is customarily admixed with further additions, sometimes to a considerable extent, in order to obtain the desired properties for the end product (the PSA). PSAs are frequently crosslinked, in order to bring about sufficient cohesion.

The starting point advantageously in accordance with the invention is an initial reaction charge, more particularly a monomer mixture, in which there are ethylenically unsaturated compounds, comprising more particularly (meth)acrylic acid and/or derivatives thereof, and this initial reaction charge is polymerized radically via a RAFT process, using RAFT CTAs.

The polymer component of the polyacrylate PSA advantageously comprises one or more polyacrylates obtainable in each case by (co)polymerization of (a1) 70 to 100 wt % of acrylic esters and/or methacrylic esters and/or the corresponding free acids, with the formula

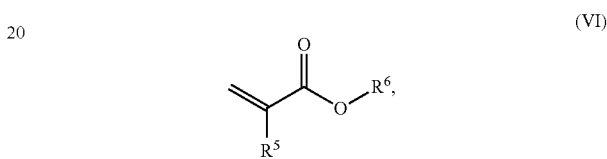

where $R^5$=H and/or $CH_3$, and $R^6$=H and/or alkyl chains having 1 to 30 C atoms, with (a2) 0 to 30 wt % of olefinically unsaturated monomers with functional groups.

The weight figures are based on the respective polyacrylate.

This polyacrylate or these polyacrylates may constitute the base polymer component of the pressure-sensitive adhesive, or else may be blended with other polymers (acrylate polymers or other polymers) to give the base polymer component.

The polymer component is especially advantageously selected such that the total content of acrylate monomers is 40 to 100% by weight, more preferably 50 to 100% by weight.

Used preferably for the monomers (a1) are acrylic and/or methacrylic esters with alkyl groups having 1 to 14 C atoms. These acrylic monomers may be selected exemplarily and advantageously from the following list, encompassing methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and the corresponding branched isomers, such as 2-ethylhexyl acrylate, for example. Other classes of compound for use, which may likewise be added in small amounts under (a1), are cyclohexyl methacrylates, isobornyl acrylate, and isobornyl methacrylates.

Used exemplarily and preferably for (a2) are monomers of the following list, encompassing maleic anhydride, itaconic anhydride, glycidyl methacrylate, benzyl acrylate, benzyl methacrylate, phenyl acrylate, phenyl methacrylate, tert-butylphenyl acrylate, tert-butyl-phenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, and tetrahydrofurfuryl acrylate, hydroxyethyl acrylate, 3-hydroxypropyl acrylate, hydroxyethyl methacrylate, 3-hydroxypropyl methacrylate, 4-hydroxybutyl acrylate, 4-hydroxybutyl methacrylate, allyl alcohol, itaconic acid, acrylamide, and cyanoethyl methacrylate, cyanoethyl acrylate, 6-hydroxyhexyl methacrylate, N-tert-butylacrylamide, N-methylolmethacrylamide, N-(butoxy-methyl)methacrylamide, N-methylolacrylamide, N-(ethoxy-methyl)acrylamide, N-isopropylacrylamide, vinylacetic acid, β-acryloyloxypropionic acid, trichloroacrylic acid, fumaric acid, crotonic acid, aconitic acid, dimethylacrylic acid, 4-vinylbenzoic acid, this enumeration not being conclusive.

Also used preferably for the component (a2) are aromatic vinyl compounds, in which the aromatic nuclei are based preferably on $C_4$ to $C_{18}$ units, but may also contain heteroatoms. Particularly preferred examples are styrene, 4-vinylpyridine, n-vinylphthalimide, methylstyrene, and 3,4-dimethoxystyrene, this enumeration not being conclusive.

For the polymerization, the monomers are selected such that the resultant polymers can be employed as thermally crosslinkable PSAs, more particularly such that the resulting polymers possess pressure-sensitively adhesive properties in line with the "Handbook of Pressure Sensitive Adhesive Technology" by Donatas Satas (van Nostrand, New York 1989).

The nature of the comonomers is selected such that the glass transition temperature $T_{g,A}$ of the polymers (glass transition temperatures are understood for the purposes of this specification to be the static glass transition temperatures as determinable via Differential Scanning calorimetry (DSC) in accordance with DIN 53765; the figures for the glass transition temperature $T_g$ in the context of this specification relate to the glass transformation temperature value Tg in accordance with DIN 53765:1994-03, unless specifically indicated otherwise) is below the application temperature, preferably at $T_{g,A}<=15°$ C. In order to achieve this, furthermore, the quantitative composition of the monomer mixture is advantageously selected such that in accordance with the Fox equation (E1) (cf. T. G. Fox, Bull. Am. Phys. Soc. 1956, 1, 123), the desired $T_{g,A}$ value for the polymer is obtained.

$$\frac{1}{T_g} = \sum_n \frac{W_n}{T_{g,n}} \tag{E1}$$

In this equation, n represents the serial number of the monomers used, $W_n$ the mass fraction of the respective monomer n (wt %), and $T_{g,n}$, the respective glass transition temperature of the homopolymer of the respective monomer n in K.

The polymers prepared preferably have a weight-average molecular weight $M_w$ of 50 000 to 600 000 g/mol, more preferably between 100 000 and 500 000 g/mol (the determination of average molecular weights $M_w$ and $M_n$ and of polydispersities P is carried out by means of size extrusion chromatography [gel permeation chromatography, GPC]; calibration: PMMA standards [polymethyl methacrylate calibration]). Depending on reaction regime, the acrylate PSAs produced by this method possess a polydispersity P of $M_w/M_n<4.5$. The inventive method is more preferably carried out such that the molecular weight distribution of the polyacrylates features a polydispersity of 2 to 3.5.

The polymerization may be carried out in bulk, in the presence of one or more organic solvents, in the presence of water, or in mixtures of organic solvents and water. The aim is to minimize the amount of solvent used. Examples of suitable organic solvents are pure alkanes (e.g., hexane, heptane, octane, isooctane), aromatic hydrocarbons (e.g., benzene, toluene, xylene), esters (e.g., ethyl acetate, propyl, butyl, or hexyl acetates), halogenated hydrocarbons (e.g., chloro-benzene), alkanols (e.g., methanol, ethanol, ethylene glycol, ethylene glycol monomethyl ether), ketones (e.g., acetone, butanone), and ethers (e.g., diethyl ethers, dibutyl ethers), or mixtures thereof. The aqueous reaction systems for aqueous polymerization reactions may be admixed with a water-miscible or hydrophilic cosolvent, in order to ensure that the reaction mixture is present in the form of a homogeneous phase during monomer conversion. Cosolvents for the present invention are selected preferably from the following group, consisting of aliphatic alcohols, glycols, ethers, glycol ethers, pyrrolidines, N-alkyl-pyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyether derivatives, aminoalcohols, ketones, and the like, and also derivatives and mixtures thereof.

Depending on conversion and temperature, the polymerization time is customarily between 4 and 72 hours. The higher the reaction temperature that can be selected, in other words the higher the thermal stability of the reaction mixture, the lower the reaction time that can be selected.

Also included in the subject matter of the invention is the reaction of the functional groups in the polymerization product that come from the RAFT CTAs with conjugated dienes subject to hetero-Diels-Alder mechanisms. This gives rise to a method for decolorization and/or deodorization of the polymers, especially for use thereof as an adhesive, more preferably as a polyacrylate pressure-sensitive adhesive.

Surprisingly it has been found that through the addition of conjugated dienes, the discoloration, caused by the RAFT reagents and/or byproducts and elimination products that arise during the preparation or reaction of the RAFT reagents, is significantly minimized and in some cases removed completely, without change to the adhesive properties of the composition. The odor of the sulfur compounds as well is in part reduced, and so is no longer perceived as a nuisance, or is not perceived at all, in the product.

The conjugated diene or dienes here may be added (admixed) advantageously to the resulting polymers, more particularly at a time at which the polymerization is largely or already completely at an end. This therefore prevents the CTAs losing their activity as a result of hetero-Diels-Alder reactions, where this activity is still necessary for the polymerization.

Suitable in accordance with the invention are all diene components able to enter into a hetero-Diels-Alder reaction with the double bonds C=X of the functional groups S—C=X from the RAFT reagents, more particularly in the polymer chains, as dienophile, as is shown schematically below:

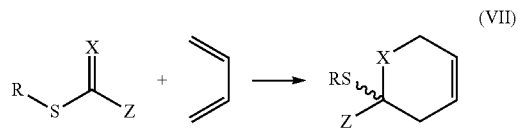

(VII)

Also contributing to the decolorizing are Diels-Alder reactions which proceed with the corresponding groups C=X in byproducts and superfluous CTA residues from the polymerization.

The activity of the conjugated dienes in terms of the functional groups originating from the CTAs can be determined by the skilled person by means of familiar considerations, without undue effort, as for instance by means of the Woodward-Hoffmann rules or using HOMO-LUMO approaches, and also, in the case of cyclic dienes, by approaches involving the reduction of ring strain. These theories are described comprehensively in numerous textbooks, and belong to the knowledge bank of the skilled person.

The dienes are very preferably selected such that they are also capable of binding thiols—which occur frequently as byproducts and usually are responsible for, or at least contribute to, the odor—by means of hydrothiolation and/or thiol-ene reaction.

The dienes used are preferably acyclic and cyclic compounds having two conjugated double bonds, more preferably electron-deficient acyclic or cyclic compounds having two conjugated double bonds. Examples of the dienes of the invention are 1,3-butadiene, 1-methoxy-1,3-butadiene, 2,4-hexadiene, (2E)-2,4-pentenedienoic acid, sorbic acid and its esters, 2,4-hexadiene-1,6-dicarboxylic acid and its esters, 1,3-cyclohexadiene, 1-methoxy-1,3-cyclohexadiene, anthracene, substituted and unsubstituted furans, substituted and unsubstituted thiophenes. Particularly preferred are substituted and unsubstituted cyclopentadienes, (E)-1-methoxy-3-trimethylsilyloxy-1,3-butadiene (Danishefsky diene), 1-(trimethylsiloxy)-1,3-butadiene, 1-(triethylsiloxy)-1,3-butadiene, and (1E,3Z)-1-methoxy-2-methyl-3-(trimethylsilyloxy)-1,3-pentadiene as dienes since these already lead to decolorization without catalyst at room temperature within a few minutes.

In addition to or as an alternative to added conjugated dienes, the dienes can also be produced in situ, especially by addition of one or more of those chemical compounds from which conjugated dienes can be produced in situ to the polymers obtained.

In addition, in accordance with the invention, the decolorization can thus also be brought about by means of those dienes that are capable of Diels-Alder reaction and are obtainable in situ, such as o-quinodimethane, for example, which may be prepared, among other ways, by means of metal catalysts from 1,2-bis(chloromethyl)benzene or 1,2-bis(bromomethyl)benzene, and also photochemically by means of UV light from (2,5-dimethylphenyl)(phenyl)-methanone derivatives.

Preference is given to the use of those conjugated dienes (admixed and/or generated in situ) for which the conjugated double bonds in the unit C=C—C=C are not substituted by heteroatoms.

Having proved to be very preferred in the sense of the invention is the combination of a dithioester as RAFT reagent, more particularly a dithioester according to one of the formulae IV and/or V above, and cyclopentadiene as conjugated diene for decolorization of the polymers, especially of the (pressure-sensitive) adhesive.

The method for decolorization of the polymers, especially of the (pressure-sensitive) adhesive, preferably takes place in solution, but can also be conducted in the melt or in dispersions, in which case the reaction can proceed either thermally or photochemically. The decolorization reaction preferably takes place at temperatures up to 120° C.; more preferably, it takes place under mild conditions up to 40° C. The reaction at low temperatures can advantageously be catalyzed by addition of a Lewis acid (e.g. $ZnCl_2$) and/or of a Brønsted acid (trifluoroacetic acid, p-toluenesulfonic acid).

The invention additionally provides the polymers, more particularly adhesives, preferably pressure sensitive adhesives, that are obtained by the method of the invention—including the decolorizing step.

Through the decolorizing reaction, the polymers obtained, more particularly the adhesives or PSAs, have cylco-1-X-hex-3-ene units in the polymer chains, and the hex-3-ene subunit may optionally also be substituted by heteroatoms (depending on the conjugated dienes used). Further provided by the invention, therefore, are acrylate-based polymers, more particularly in the form of adhesive, preferably pressure sensitive adhesive, which comprise cyclo-1-X-hex-3-ene units with X=S, O or N in the polymer chains, more particularly those polymers of this kind that are obtainable by the method of the invention. The majority of these polymers will have exactly one such cyclo-1-X-hex-3-ene unit per polymer chain.

According to adhesive or self-adhesive properties already present, the polymers of the invention, as already indicated, may be used very effectively as adhesives, more particularly as PSAs, or may be further-processed to such, since their polymer structure and the polydispersity can be controlled very effectively and hence the technical adhesive properties can be tailored to the intended end use, and it is nevertheless possible to provide virtually colorless polymer systems. Since the decolorizing reaction of the invention causes no substantial alteration to the structure and the composition of the polymer, the properties of the adhesive are unaffected.

For use in particular as PSAs, the base polymer component (or the already partly blended PSA) may be admixed with customary additives that are useful for obtaining and/or improving the pressure-sensitive adhesion properties, or with additives useful for obtaining and/or improving other properties.

It is possible in particular, accordingly, to admix resins, more particularly tackifying resins. Tackifying resins which can be used are, for example, the tackifier resins that are known and are described in the literature. In general it is possible to use all resins that are compatible (soluble) with the corresponding adhesive, reference being made more particularly to all aliphatic, aromatic, and alkyl-aromatic hydrocarbon resins, hydrocarbon resins based on pure monomers, hydrogenated hydrocarbon resins, functional hydrocarbon resins, and natural resins.

Examples include the pinene resins, indene resins, and rosins, their disproportionated, hydrogenated, polymerized, and esterified derivatives and salts, the aliphatic and aromatic hydrocarbon resins, terpene resins and terpene-phenolic resins, and also C5, C9 and other hydrocarbon resins. Combinations of these and further resins may be used specifically in order to bring the properties of the resultant adhesive into line with requirements.

It is optionally possible, moreover, for plasticizers (plasticizing agents), fillers (e.g., fibers, carbon black, zinc oxide, titanium dioxide, chalk, solid or hollow glass beads, microbeads of other materials, silica, silicates), nucleators, expandants, compounding agents and/or aging inhibitors, in the form, for example, of primary and secondary antioxidants or in the form of light stabilizers, to be added.

Compatible crosslinker substances may be added in order to generate crosslinking. Examples of suitable crosslinkers include metal chelates, polyfunctional isocyanates, polyfunctional epoxides, polyfunctional aziridines, polyfunctional oxazolines, or polyfunctional carbodiimides. Polyfunctional acrylates as well may be used with advantage as crosslinkers for actinic irradiation.

In the context of the use of the polymers obtainable in accordance with the invention as adhesives, more particularly as pressure sensitive adhesives, it is appropriate for them to be made available in the form of an adhesive tape, applied to one or both sides of a carrier. The adhesive tapes may have further layers, such as, for instance, further carrier layers, functional layers, or the like.

For the anchoring of the PSA on the carrier or on another substrate it may be an advantage if the composition and/or the substrate is treated, prior to coating, by corona or plasma. Examples of apparatus suitable for atmospheric plasma treatment include those from Plasmatreat.

For processing and for the anchoring of the layer of (pressure sensitive) adhesive with further possible layers, such as carriers, for example, such as a film based on polyester, polyamide, polymethacrylate, PVC, etc., for example, or with a viscoelastic foamed or unfoamed carrier based on polyacrylate or polyurethane, it may further be of advantage for chemical anchoring to take place, via a primer, for example.

The internal strength (cohesion) of the PSA is preferably boosted by crosslinking. For PSA use, particular preference is given to employing those polyacrylate-based compositions which are coordinatively or covalently crosslinkable, in order to ensure that the adhesive possesses a constant profile of properties. For crosslinkings of this kind, the prior addition of suitable crosslinkers is advantageous, particularly those of the kind listed earlier on above.

For transport, storage, or diecutting, the single-sided or double-sided adhesive tape is preferably provided on at least one side with a liner, that is, for example, with a silicone-coated film or silicone paper.

A further advantageous embodiment of the invention is the use of a layer of a carrier-free (pressure sensitive) adhesive in the form of a self-adhesive (pressure sensitive) adhesive tape, in other words as what is called an adhesive transfer tape. A carrier-free adhesive is an adhesive which has no permanent carrier. Instead, in a preferred configuration, the self-adhesive composition is applied merely to a temporary carrier, this being material which serves only temporarily for the support and easier application of the self-adhesive composition. Such temporary carriers are also referred to as liners, and may advantageously exhibit a release effect, by means of suitable surface coatings, for instance. For the use of the layer of (pressure sensitive) adhesive for bonding to a substrate surface, the liner is then removed, and the liner therefore does not constitute a productive component.

An (adhesive or nonadhesive) polymer layer of the invention of this kind may be produced from solution and also from the melt. For the latter case, suitable production procedures include both batch processes and continuous processes. Particularly preferred is the continuous manufacture by means of an extruder with subsequent coating directly on a liner with or without a layer of adhesive.

The polymer layer of the invention can be produced in various thicknesses, including, in particular, with a layer thickness of at least 25 μm, preferably of at least 100 μm, more preferably of at least 200 μm.

The invention is elucidated in more detail below by a number of examples, without the invention being restricted as a result.

EXAMPLES

Test Methods

The following test methods were employed in order to evaluate both the technical adhesive properties and the general properties of the PSAs prepared.

Gel Permeation Chromatography GPC (Test A)

The average molecular weights $M_n$ and $M_w$ and the polydispersity P were determined using gel permeation chromatography. The eluent employed was THF with 0.1 vol % of trifluoroacetic acid. Measurement was carried out at 25° C. The preliminary column used was PSS-SDV, 5μ (5 μm), 103 Å (0.0103 μm) ID 8.0 mm×50 mm. Separation took place using the columns PSS-SDV, 5μ (5 μm), 103 Å (0.0103 μm) and also 105 Å (0.0105 μm) and 106 Å (0.0106 μm) each with ID 8.0 mm×300 mm. The sample concentration was 4 g/l, the flow rate 1.0 ml per minute. Measurement was made against PMMA standards.

180° Bond Strength Test (Test B)

A strip 20 mm wide of an acrylate PSA applied as a layer to a polyester carrier was applied by the exposed side to steel plates which had been washed twice with acetone and once with isopropanol beforehand, or PE plates. The pressure-sensitive adhesive strip was pressed onto the substrate twice with a 2 kg weight. Immediately thereafter, the adhesive tape was peeled from the substrate at 300 mm/min and at a 180° angle, and the force required was measured. All measurements were carried out at room temperature. The measurement results are reported in N/cm and as the arithmetic mean from three measurements.

Shear Strength (Test C)

A strip 13 mm wide of the adhesive tape was applied to the smooth surface of a steel plate, which was cleaned three times with acetone and once with isopropanol, such that the area of adhesion is 20 mm·13 mm (length·width), one of the narrow edges of the area of adhesion adjoins flush with one of the edges of the steel plate and the adhesive tape projects unsupported beyond this edge of the steel plate. Subsequently, a contact pressure of 2 kg was used to press the adhesive tape onto the steel plate four times in the region of the area of adhesion.

The steel plate was then suspended such that said edge of the steel plate points downward and the protruding end of the adhesive tape hangs downward in an unsupported manner. At room temperature, a 1 kg weight was secured to the protruding end of the adhesive tape and the process of detachment of the adhesive tape was observed. The holding powers measured are the times after which the adhesive tape fell off the carrier, reported in minutes, and correspond to the arithmetic mean from three measurements.

Color Analysis (L*a*b* Color Space Analysis) (Test D)

The L*a*b* color space is a measurement space that contains all perceptible colors. The color space is constructed on the basis of the theory of opposite colors. One of the most important properties of the L*a*b* color model is its independence from the instrument, meaning that the colors are defined independently of the way in which they are produced and the reproduction technology. The corresponding German standard is DIN 6174: "Colorimetric evaluation of colour coordinates and colour differences according to the approximately uniform CIELab colour space".

The colors were determined with a BYK Gardner spectro-guide colorimeter. The colors were determined according to the CIELab scale with the D/65° illuminant. In this three-dimensional color space, the following axes are defined:

L*=brightness (0=black, 100=white
a*=red–green (−120=green, +120=red)
b*=yellow–blue (−120=blue, +120=yellow)

REFERENCE TILE

Bianco Luce White Shiny, S. White Line, 1234567359687 type 01, 20×20×0.7 cm.
Production of the Investigation Specimens and Experimental Investigation
Preparation of bis-2,2'-phenylethyl thiocarbonate (1)

The bis-2,2'-phenylethyl thiocarbonate was synthesized starting from 2-phenylethyl bromide with carbon disulfide and sodium hydroxide in accordance with a procedure from *Synth. Communications* 1988, 18, 1531-1536. Yield after distillation: 72%.

Characterization: $^1$H NMR (CDCl$_3$) δ (ppm): 7.20-7.40 (m, 10H), 1.53, 1.59 (2×d, 6H), 3.71, 3.81 (2×m, 2H).
Trithiocarbonate-Functionalized Polystyrene (2):

A 500 ml Schlenk vessel was charged with 400 ml of styrene and 3.47 g of the trithiocarbonate (1) (11.72 mmol), the vessel was degassed three times and then the polymerization was conducted under argon. For initiation, the vessel was heated up to 120° C. and polymerization was effected while stirring for 30 h. For isolation, the batch was cooled to RT, and the polymer was dissolved in 1000 ml of dichloromethane and then precipitated in 7.5 l of methanol with vigorous stirring. The precipitate was filtered off using a frit and then analyzed by means of GPC ($M_n$=23 500 g/mol, $M_w/M_n$=1.32).

Example 1

A conventional reactor for free-radical polymerizations was charged with 32 g of trithiocarbonate-functionalized polystyrene (2), 442 g of 2-ethylhexyl acrylate, 4.5 g of acrylic acid and 0.12 g of Vazo 67® (from DuPont). After passing argon through for 20 minutes and degassing twice, the reactor was heated up to 70° C. and polymerization was effected for 16 h. For isolation, the batch was cooled to RT, and the PS-P(EHA/AA)-PS block copolymer was diluted to 50% with acetone and then coated onto a PET carrier 23 μm thick by means of a conventional coating bar and then dried at 120° C. for 15 minutes. The coatweight was 50 g/m². The polymer has a pale yellowish color. GPC analysis: $M_n$=95 500 g/mol, $M_w/M_n$=2.24. Subsequently, testing was effected by test methods B and C (see table 1).

Example 2

A reactor conventional for radical polymerizations was charged with 32 g of n-butyl acrylate, 442 g of 2-ethylhexyl acrylate, 4.5 g of acrylic acid, 1.40 g of 4-(benzothioylsulfanyl)-4-cyanopentanoic acid (5.00 mmol, Aldrich, CAS No. 201611-92-9), and 0.12 g of Vazo 67® (DuPont). After argon had been passed through the reactor for 20 minutes and the reator had been twice degassed, the reactor was heated to 70° C. with stirring and polymerization was carried out for 16 hours. For isolation the batch was cooled to room temperature, the polymer was diluted with acetone to 50%, 0.2 wt %, based on the polymer, of aluminum acetylacetonate (Aldrich, CAS No. 13963-57-0) was added, and the resulting compositions were then coated using a conventional bar coater on a 23 μm PET carrier, followed by drying at 120° C. for 15 minutes. The coatweight was 50 g/m². The polymer has a reddish coloration. GPC analysis: ($M_n$=104 000 g/mol, $M_w/M_n$=2.09). Testing took place subsequently in accordance with test methods B and C (see table 1).
Decolorization of the Adhesive (Examples 1a and 2a)

1.2 equivalents, based on the molar amount of the RAFT CTA used beforehand, of freshly distilled cyclopentadiene are added dropwise to the polymer solutions prepared in examples 1 and 2 at room temperature with vigorous stirring. Subsequently, the solutions were stirred for a half hour, in the course of which a distinct decrease in the discoloration was detectable. The solutions were each only slightly yellowish and were diluted to 50% with acetone. Subsequently, 0.2% by weight, based on the polymer, of aluminum acetylacetonate (Aldrich, CAS No. 13963-57-0) was added to the solution from example 2, and the two solutions were coated onto a PET carrier 23 μm thick using a conventional coating bar and dried at 120° C. for 15 minutes. The coatweight was 50 g/m² in each case.

This was followed by testing by test methods B, C and D (see tables 1 and 2).
Results

TABLE 1

Adhesion data

| Example | Bond strength to steel [N/cm] | Bond strength to PE [N/cm] | Holding powers [min] |
|---|---|---|---|
| 1 | 3.2 | 2.1 | >10 000 |
| 1a | 3.2 | 2.1 | >10 000 |
| 2 | 4.5 | 2.5 | 5400 |
| 2a | 4.5 | 2.4 | 5500 |

TABLE 2

L*a*b* values

| Example | L* | a* | b* |
|---|---|---|---|
| 1 | 86.25 | −0.41 | 3.08 |
| 1a | 92.28 | −0.12 | 2.36 |
| 2 | 79.68 | −1.52 | 4.40 |
| 2a | 92.26 | −0.06 | 2.25 |

The experiments demonstrate that, after the addition of cyclopentadiene, the color was distinctly reduced while maintaining the adhesive properties. The discoloration of the polymers using trithiocarbonates as RAFT CTAs is generally less than that when using dithioesters as RAFT CTAs. Even in the case of trithiocarbonates, very good decolorization of the polymers can be detected, but the decolorization reaction when dithioesters are used runs far more efficiently.

The invention claimed is:

1. A method for producing a pressure-sensitive acrylate-based adhesive polymer having a glass transition temperature $T_{g,A}$ of less than 15° C., a weight average molecular weight range of 100,000 to 500,000, and a polydispersity of 2-3.5, wherein first a controlled radical polymerization reaction of an initial reaction charge comprising at least one acrylate-based monomer is carried out in the presence of at least one chain transfer agent (CTA) having at least one functional S—C═X group, where X═S, O or N, the CTA being selected from the group consisting of dithioesters, dithiocarbonates, dithiocarbamates, trithiocarbonates, imidodithiocarbonates, and xanthates ("RAFT CTAs"), wherein CTA molecules are incorporated into the polymer chains that form, whereby the polymer chains have the functional group of the incorporated CTA, wherein at least one chemical compound which has at least two conjugated double bonds ("conjugated diene") is contacted with the polymers thus obtained, so that hetero-Diels-Alder reactions are brought about between the double bonds C=X of the functional groups S—C=X incorporated into the polymer chains and the conjugated double bonds of the conjugated diene.

2. The method as claimed in claim 1, wherein the polymers obtained are admixed with at least one chemical compound from which it is possible in situ to generate a chemical compound which has at least two conjugated double bonds.

3. The method as claimed in claim 1, wherein the compounds having the conjugated double bonds in the unit C=C—C=C are not heterosubstituted.

4. The method as claimed in claim 1, wherein the conjugated dienes are selected from the group consisting of 1,3-butadiene, 1-methoxy-1,3-butadiene, 2,4-hexadiene, (2E)-2,4-pentanedienoic acid, sorbic acid and its esters, 2,4-hexadiene-1,6-dicarboxylic acid and its esters, 1,3-cyclohexadiene, 1-methoxy-1,3-cyclohexadiene, anthracene, substituted and unsubstituted furans, substituted and unsubstituted thiophenes, substituted and unsubstituted cyclopentadienes, (E)-1-methoxy-3-trimethylsilyloxy-1,3-butadiene, 1-(trimethylsiloxy)-1,3-butadiene, 1-(triethylsiloxy)-1,3-butadiene, and (1E,3Z)-1-methoxy-2-methyl-3-(trimethylsilyloxy)-1,3-pentadiene.

5. The method as claimed in claim 1, wherein the chain transfer agent (CTA) used is a dithioester.

6. An adhesive composition comprising the acrylate-based polymers according to claim 1.

7. The adhesive composition as claimed in claim 6, wherein the adhesive composition is a pressure sensitive adhesive.

8. The method as claimed in claim 1, wherein the chain transfer agent (CTA) is

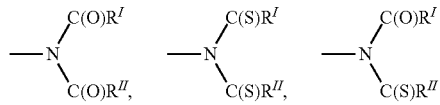

(IV) and/or (V)

wherein $R^2$ is selected from the group consisting of the groups a) to m), $R^{III}$ and $R^{IV}$ are radicals selected from the group consisting of the groups a) to g):

a) branched and unbranched $C_1$ to $C_{18}$ alkyl, branched and unbranched $C_3$ to $C_{18}$ alkenyl, and branched and unbranched $C_3$ to $C_{18}$ alkynyl radicals b) ethenyl and ethynyl radicals c) unsubstituted or substituted phenyl radicals, and unsubstituted or substituted benzyl radicals d) $C_3$ to $C_{12}$ cycloalkyl radicals e) aromatic heterocyclic radicals f) substituted radicals of group a):
  f1) radicals of group a) each substituted by at least one OH group, halogen atom or silyl ether,
  f2) radicals of group a) each substituted by at least one ester, amine, carbonate, cyano, isocyano and/or epoxide group and/or by sulfur, g) substituted radicals of group b):
  g1) radicals of group b) each substituted by at least one OH group, halogen atom or silyl ether,
  g2) radicals of group b) each substituted by at least one ester, amine, carbonate, cyano, isocyano and/or epoxide group and/or by sulfur, h) —$NH_2$, —$NHR^I$, —$NR^I R^{II}$, —NH—C(O)—$R^I$, —$NR^I$—C(O)—$R^{II}$, —NH—C(S)—$R^I$, —$NR^I$—C(S)—$R^{II}$,

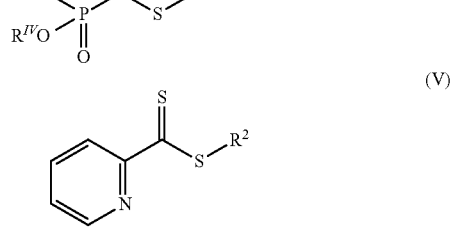

where $R^I$ and $R^{II}$ are radicals selected independently of one another from groups a) to g)

i) —S—$R^I$, —S—C(S)—$R^I$, where $R^I$ is a radical selected from one of groups a) to g), k) —O—$R^I$, —O—C(O)—$R^I$, where $R^I$ is a radical selected from one of groups a) to g), l) —P(O)(O$R^{III}$)(O$R^{IV}$), where $R^{III}$ and $R^{IV}$ are identical or radicals selected independently of one another from groups a) to g), m) $C_2$ to $C_{18}$ heteroalkyl radicals having at least one O atom and/or at least one $NR^I$ group in the carbon chain, where $R^I$ is a radical selected from one of groups a) to g).

* * * * *